United States Patent
Gupta et al.

(10) Patent No.: US 6,226,752 B1
(45) Date of Patent: May 1, 2001

(54) METHOD AND APPARATUS FOR AUTHENTICATING USERS

(75) Inventors: Abhay Gupta, Milpitas, CA (US); Chris Ferris, Whitinsville, MA (US); Alejandro Abdelnur, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/309,341

(22) Filed: May 11, 1999

(51) Int. Cl.[7] ............................... H04L 9/32; H04L 9/00; G06F 11/30
(52) U.S. Cl. ........................................... 713/201; 713/200
(58) Field of Search ..................... 713/201, 200, 713/202

(56) References Cited

U.S. PATENT DOCUMENTS

| | | | |
|---|---|---|---|
| 5,796,393 | * 8/1998 | MacNaughton et al. | 345/329 |
| 5,841,970 | * 11/1998 | Tabuki | 713/201 |
| 6,032,184 | * 2/2000 | Cogger et al. | 709/223 |
| 6,049,877 | * 4/2000 | White | 713/201 |
| 6,081,900 | * 6/2000 | Subramaniam et al. | 713/201 |

OTHER PUBLICATIONS

Henry Lieberman, Using Prototypical Objects to Implement Shared Behavior in Object Oriented Systems, OOPSLA 86 Proceedings, Sep. 1986, pp. 214–223.

* cited by examiner

Primary Examiner—Ly V. Hua
(74) Attorney, Agent, or Firm—The Hecker Law Group (57) ABSTRACT

A method and apparatus for authenticating users. Prior art mechanisms require each individual application (running on an "application server") that the user is accessing to provide for the ability to use the various authentication mechanisms. One or more embodiments of the invention externalize the authentication mechanism from the application in the form of a login server. Only the login server needs to be configured to handle authentication mechanisms. The application server checks if a request has an active and valid session (e.g., a valid session may exist when there is active communication between a client and server that has not expired). If there is not a valid session, the application server redirects the user to the login server. The login server attempts to authenticate the user using any desired authentication mechanism. Once authenticated, the login server redirects the user back to the application server. The application server verifies the authentication directly with the login server. Once verified, the application server processes the user's request and responds accordingly. One or more embodiments of the invention may utilize cookies to aid in the authentication process. Thus, applications on the application server need not be concerned about authenticating a given user. The application server merely knows how to work with the login server to authenticate the user. Further, communications between the application server and login server are transparent (or without any interaction from) the user (although the user may see the browser communicating with each server).

32 Claims, 4 Drawing Sheets

METHOD AND APPARATUS FOR AUTHENTICATING USERS

BACKGROUND OF THE INVENTION

1. Field of the Invention

This invention relates to the field of computer networks, and, more specifically, to authenticating users on a network.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

When executing applications on a computer, an application often requires users to authenticate themselves prior to performing any actions to prevent unauthorized access. For example, a user may have to provide identification with a user name and password, may have to supply a serial number for the software being installed, or may have to insert an identification card that provides account information and the user must type in a personal identification number (PIN) (e.g., with Automated Teller Machines (ATMs)). Further, depending on where the client/user is located, different authentication may be required. For example, if a user is on logging onto a network at the user's office, a username and password may be required. But if the user is logging onto the user's office's network from home, an additional username and password may be required (or a different mechanism may be required).

Prior art mechanisms require each individual application that the user is accessing (e.g., internet email software, new word processing software, an ATM machine, etc.) to provide for the ability to use the various authentication mechanisms (e.g., each application must provide separately for the username/password mechanism, serial number mechanism, id card/PIN mechanism, or other authentication mechanism). Thus, every time an application has to support a new authentication mechanism, the application has to undergo implementation changes to deal with the new mechanism. For example, if the user forgot the username and password and wants to use an id card and PIN number to install new software instead, the application must be modified to provide for the different authentication mechanism. A method and apparatus for authenticating users without modifying individual applications is useful and needed.

To provide a better understanding of the prior art, and prior art authentication mechanisms, a description of networks and object oriented programming is useful.

Networks

In modem computing environments, it is commonplace to employ multiple computers or workstations linked together in a network to communicate between, and share data with, network users (also referred to as "clients"). A network also may include resources, such as printers, modems, file servers, etc., and may also include services, such as electronic mail.

A network can be a small system that is physically connected by cables (a local area network or "LAN"), or several separate networks can be connected together to form a larger network (a wide area network or "WAN"). Other types of networks include the internet, tel-com networks, the World Wide Web, intranets, extranets, wireless networks, and other networks over which electronic, digital, and/or analog data may be communicated.

Computer systems sometimes rely on a server computer system (referred to as a "server") to provide information to requesting computers on a network. When there are a large number of requesting computers, it may be necessary to have more than one server computer system to handle the requests.

The Internet

The Internet is a worldwide network of interconnected computers. An Internet client accesses a computer (or server) on the network via an Internet provider. An Internet provider is an organization that provides a client (e.g., an individual or other organization) with access to the Internet (via analog telephone line or Integrated Services Digital Network line, for example). A client can, for example, read information from, download a file from or send an electronic mail message to another computer/client/server using the Internet.

To retrieve a file or service on the Internet, a client must search for the file or service, make a connection to the computer on which the file or service is stored, and download the file or service. Each of these steps may involve a separate application and access to multiple, dissimilar computer systems. The World Wide Web (WWW) was developed to provide a simpler, more uniform means for accessing information on the Internet.

The components of the WWW include browser software, network links, servers. and WWW protocols. The browser software, or browser, is a user-friendly interface (i.e., frontend) that simplifies access to the Internet. A browser allows a client to communicate a request without having to learn a complicated command syntax, for example. A browser typically provides a graphical user interface (GUI) for displaying information and receiving input. Examples of browsers currently available include Mosaic, Netscape Navigator and Communicator, Microsoft Internet Explorer, and Cello.

Information servers maintain the information on the WWW and are capable of processing a client request. Hypertext Transport Protocol (HTTP) is the standard protocol for communication with an information server on the WWW. HTTP has communication methods that allow clients to request data from a server and send information to the server.

To submit a request, the client contacts the HTTP server and transmits the request to the HTTP server. The request contains the communication method requested for the transaction (e.g., GET an object from the server or POST data to an object on the server). The HTTP server responds to the client by sending a status of the request and the requested information. The connection is then terminated between the client and the HTTP server.

A client request therefore, consists of establishing a connection between the client and the HTTP server, performing the request, and terminating the connection. The HTTP server does not retain any information about the request after the connection has been terminated. HTTP is, therefore, a stateless protocol. That is, a client can make several requests of an HTTP server, but each individual request is treated independent of any other request. The server has no recollection of any previous request.

To protect information in internal computer networks from external access, a firewall is utilized. A firewall is a mechanism that blocks access between the client and the server. To provide limited access to information, a proxy or proxy server may sit atop a firewall and act as a conduit, providing a specific connection for each network connection. Proxy software retains the ability to communicate with external sources, yet is trusted to communicate with the internal network. For example, proxy software may require a user to authenticate himself/herself by supplying a username and password in order to access certain sections of the internal network and completely block other sections from any external access.

An addressing scheme is employed to identify Internet resources (e.g., HTTP server, file or program). This addressing scheme is called Uniform Resource Locator (URL). A URL contains the protocol to use when accessing the server (e.g., HTTP), the Internet domain name of the site on which the server is running, the port number of the server, and the location of the resource in the file structure of the server.

The WWW uses a concept known as hypertext. Hypertext provides the ability to create links within a document to move directly to other information. To activate the link, it is only necessary to click on the hypertext link (e.g., a word or phrase). The hypertext link can be to information stored on a different site than the one that supplied the current information. A URL is associated with the link to identify the location of the additional information. When the link is activated, the client's browser uses the link to access the data at the site specified in the URL.

If the client request is for a file, the HTTP server locates the file and sends it to the client. An HTTP server also has the ability to delegate work to gateway programs. The Common Gateway Interface (CGI) specification defines a mechanism by which HTTP servers communicate with gateway programs. A gateway program is referenced using a URL. The HTTP server activates the program specified in the URL and uses CGI mechanisms to pass program data sent by the client to the gateway program. Data is passed from the server to the gateway program via command-line arguments, standard input, or environment variables. The gateway program processes the data and returns its response to the server using CGI (via standard input, for example). The server forwards the data to the client using the HTTP.

A browser displays information to a client/user as pages or documents (referred to as "web pages" or "web sites"). A language is used to define the format for a page to be displayed in the WWW. The language is called Hypertext Markup Language (HTML). A WWW page is transmitted to a client as an HTML document. The browser executing at the client parses the document and displays a page based on the information in the HTML document.

HTML is a structural language that is comprised of HTML elements that are nested within each other. An HTML document is a text file in which certain strings of characters, called tags, mark regions of the document and assign special meaning to them. These regions are called HTML elements. Each element has a name, or tag. An element can have attributes that specify properties of the element. Blocks or components include unordered list, text boxes, check boxes, and radio buttons, for example. Each block has properties such as name, type, and value. The following provides an example of the structure of an HTML document:

```
<HTML>
    <HEAD>
    .... element(s) valid in the document head
    </HEAD>
    <BODY>
    .... element(s) valid in the document body
    </BODY>
</HTML>
```

Each HTML element is delimited by the pair of characters "<" and ">". The name of the HTML element is contained within the delimiting characters. The combination of the name and delimiting characters is referred to as a marker, or tag. Each element is identified by its marker. In most cases, each element has a start and ending marker. The ending marker is identified by the inclusion of an another character, "/" that follows the "<" character.

HTML is a hierarchical language. With the exception of the HTML element, all other elements are contained within another element. The HTML element encompasses the entire document. It identifies the enclosed text as an HTML document. The HEAD element is contained within the HTML element and includes information about the HTML document. The BODY element is contained within the HTML. The BODY element contains all of the text and other information to be displayed. Other HTML elements are described in HTML reference manuals.

Authentication Mechanisms

For a client to access or request an action (e.g., execution of an application) by a server, a server or application may require that the client is authorized for the particular request. For example, a server that provides information to a client based on a subscription or payment from the client needs to ensure a particular user is authorized and authenticated prior to permitting access to the information. Several different methods exist in the prior art for authenticating a given user/client. Three examples of authentication mechanisms/schemas are username/password, challenge-response, and smart cards.

The username/password authentication schema requires a user to enter a username and password to authenticate himself/herself. Thus, when a user/client requests access to data or attempts to execute an application (such as search on a proprietary database), the server that runs the application requests that the user enter a username and a password that has previously been assigned to/selected by the user. Once the correct username and corresponding password has been entered by the user, the server allows the user to access the desired information or executes the desired application.

The challenge-response authentication schema requires the requesting user to provide the server with information in response to a request by the server. For example, in one type of challenge-response schema, when a user requests execution of an application or access to data, the server requests the username. Once the user provides the username, the server provides a challenge or a question to the user that can only be responded to/answered by utilizing information that has been previously provided to the user. For example, the user may be provided a book and the server may ask a trivia question on information that can be found in the book. Alternatively, a number log may be provided to the user and in response to one number, the user must look up a corresponding number and provide it back to the server. Alternatively, the user may be provided with a calculator preprogrammed to perform a given calculation when a number is entered. With such a calculator, the server provides a number or word to the user, the user enters the number or word in the calculator, and the calculator provides a response for the user to transmit back to the server. In this manner, the server "challenges" the user, and the user provides a "response".

In some challenge-response schema, each time a user requests access to information or requests execution of an application, the challenge provided by the server to the user is different, thereby resulting in a different response. Thus, even if a response is intercepted by a hacker, the intercepted response will not work when the hacker attempts to access information or execute an application on the server.

One additional schema is that of a smart card. Similar to a credit card, a smart card stores information on an integrated microprocessor chip located within it. There are two basic types of smart cards: an "intelligent" smart card and a memory card. An "intelligent" smart card has a processing unit that enables the card to store and secure information, and make decisions according to any installed applications. A memory card is utilized primarily to store information such as a value that the user can spend in a pay phone, retail, vending or related transaction. Due to the integrated chip in a smart card, information and applications are protected within the card. When used as an authentication mechanism, a smart card may contain a card-holder's photograph, printed name and signature, or an identification number. Thus, a smart card may be utilized like an identification card to verify or authenticate the person attempting to access information or execute an application. To utilize a smart card, a receptacle or device for reading the card must be utilized. Further, an application or software that communicates with the smart card must be utilized to retrieve the information from the smart card.

As described, various authentication mechanisms are available. However, in order to utilize a different mechanism to authenticate a user, the application that requires authentication for access must be modified and programmed to support the mechanism. Thus, when multiple applications are utilized, any new authentication mechanism requires substantial time and programming to accommodate the mechanism.

Cookies

One or more authentication mechanisms on the internet may utilize information/tool referred to as a "cookie". Cookies are small pieces of information stored on individual's browsers that can later be read back from the browser. When a web site is accessed, a cookie may be sent by the web site identifying itself to the web browser. Cookies are stored by the browser and may be read back by a server at a later date. Cookies may be utilized for a variety of reasons including the ability to personalize information, to perform targeted advertising, or to track popular links or demographics. For example, a book store on the web may store a cookie that contains the user's name and password. Thereafter, whenever the user accesses the book store's web site, the cookie is retrieved, and the user need not log in to the book store's site.

Cookies can store a variety of information including database information and custom page settings. A cookie is merely an HTTP header that consists of a text-only string that gets entered into the memory of a browser. The string contains information (referred to as "parameters") such as the name of the cookie, the value of the cookie, the expiration date of the cookie, the path the cookie is valid for, the domain the cookie is valid for, and the need for a secure connection to exist to use the cookie. Each cookie has a name and value. For example, the name of a cookie may correspond to the web site owner's name (e.g., SUN_ID may be the name of the cookie for Sun Microsystems™) and the value may be an identification number for the particular user. By utilizing a name and value, a web site may store personal information to be displayed to a particular user every time the cookie from that user is retrieved by the server. The expiration parameter defines the lifetime of the cookie (e.g., how long the cookie is valid for). The path parameter defines the URL path the cookie is valid for (i.e., web pages outside of the specified path cannot read or use the cookie). The domain parameter specifies the domain that can access the cookie. For example, if the domain parameter is ".sun.com", only cookie requests that originate from pages located on the ".sun.com" domain server will be permitted. Further, after a server sends a cookie to a browser, any future requests made by the browser to the parameters specified in the cookie (e.g., the specified path and domain) the browser forwards the cookie with the request. The secure parameter is either TRUE or FALSE depending on whether a secure server condition is required to access the particular cookie.

By utilizing cookies, a server can authenticate a user based on the cookie (i.e., by reading the name and variable stored in the cookie) and not require a user to reauthenticate itself each time. The first time a client/user accesses a server, the server may authenticate a user (e.g., using a user name and password mechanism) and issues a cookie with a name and variable that uniquely identifies the authenticated client. For example, after authenticating a user, a server may generate a unique random number, create a cookie with the unique random number as a value, and transmit the cookie back to the user's browser. The server may also store the user's information (in the server) using the unique random number as a key. Thereafter, the cookie is similar to a key in that the server merely retrieves the cookie (with the identifying information (e.g., using the unique random number as a key)) instead of requiring the user to reenter a username and password. However, a hacker may simply type in the authenticating cookie in the hacker's browser (e.g., a hacker may intercept a cookie transmission and enter it into it's own cookie file) to emulate a particular user. Thereafter, the hacker can gain access (while pretending to be the user) to the server that retrieves the cookie. However, if network security can be compromised by a hacker, one prior art solution suggests utilizing the HTTPS (hypertext transport secure) protocol to raise security.

Regardless of whether cookies are utilized, server applications must be modified to provide for any new authentication mechanisms. Further, a single sign on solution for web applications or stand alone client/server applications, and a method for authenticating users that is transparent to the user is desirable.

SUMMARY OF THE INVENTION

A method and apparatus for authenticating users. Prior art mechanisms require each individual application (running on an "application server") that the user is accessing (e.g., internet email software, new word processing software, an ATM machine, etc.) to provide for the ability to use the various authentication mechanisms (e.g., each application must provide separately for the username/password mechanism, serial number mechanism, or id card/PIN mechanism).

One or more embodiments of the invention externalize the authentication mechanism from the application. The externalization may take the form of a login server. Accordingly, only the login server needs to be configured to handle authentication mechanisms.

According to one or more embodiments of the invention, the application server checks if a request has an active and valid session (e.g., a valid session may exist when there is active communication between a client and server that has not expired). If there is not a valid session, the application server redirects the user to the login server. The login server attempts to authenticate the user using any desired authentication mechanism. Once authenticated, the login server redirects the user back to the application server. The application server then verifies the authentication directly with the login server. Once verified, the application server processes the user's request and responds accordingly. To process, redirect, and authenticate the user, one or more embodiments of the invention may utilize a user's cookies or tokens.

In this manner, the applications on the application server need not be concerned about authenticating a given user. The application server merely needs to know how to work with the login server to authenticate the user. Further, communications between the application server and login server are transparent (or without any interaction from) the user (although the user may see the browser communicating with each server).

DETAILED DESCRIPTION OF THE INVENTION

The invention is a method and apparatus for authenticating users. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiment of Computer Execution Environment (Hardware)

Figure 1:
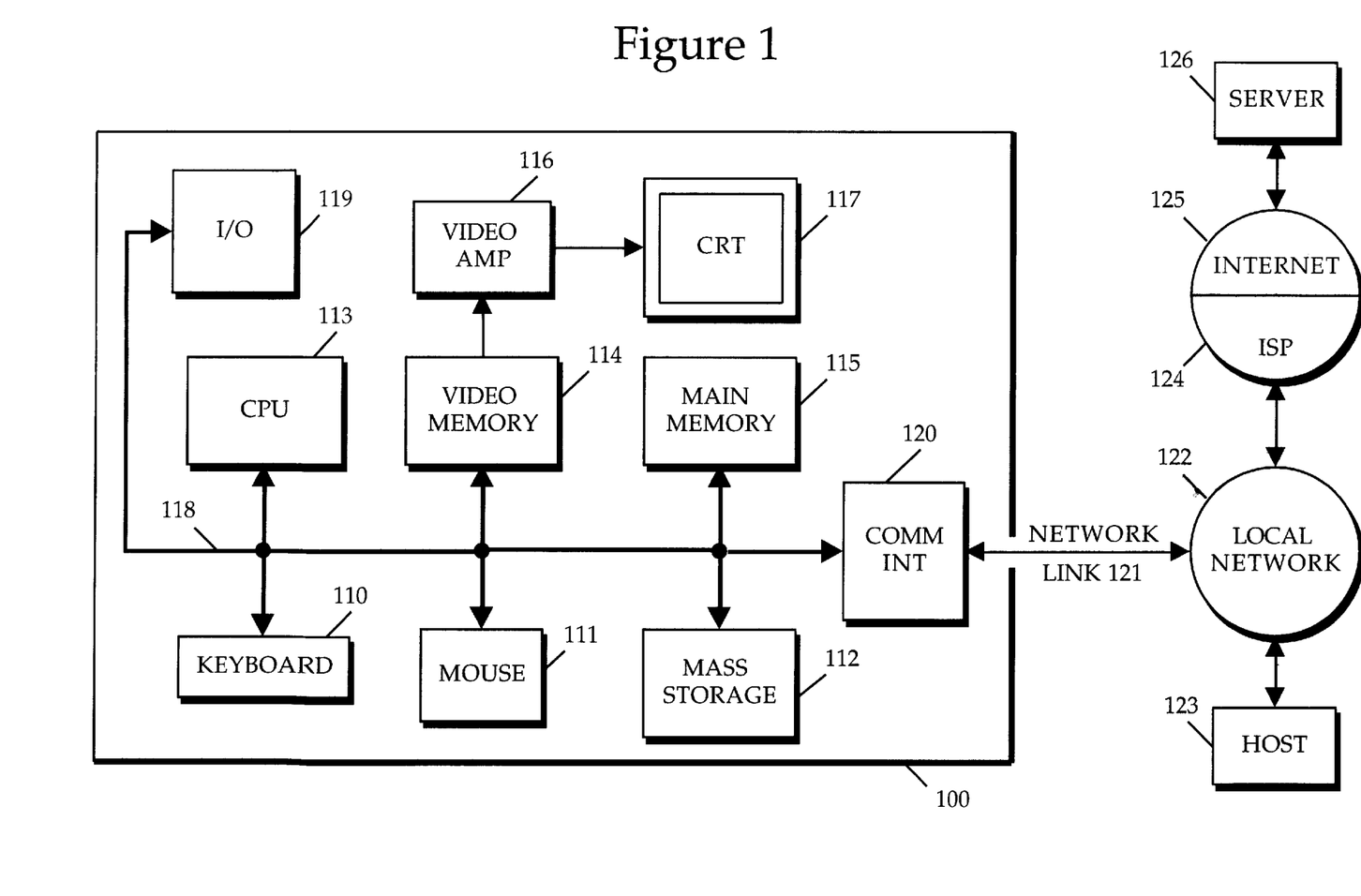
FIG. 1 is a block diagram of one embodiment of a computer system capable of providing a suitable execution environment for one or more embodiments of the invention.

An embodiment of the invention can be implemented as computer software in the form of computer readable code executed on a general purpose computer such as computer 100 illustrated in FIG. 1, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 110 and mouse 111 are coupled to a system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to system bus 118 represents such I/O elements as a printer, A/V (audio/video) I/O, etc.

Computer 100 includes a video memory 114, main memory 115 and mass storage 112, are coupled to system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 64-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Sun Microsystems, Inc., such as the SPARC™ microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such downloaded application is the apparatus for selecting attachments described herein.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Utilization of Computer Software

Various applications that provide for the user authentication according to one or more embodiments of the invention may contain multiple related functions and data structures. One embodiment of the invention utilizes a standard object oriented programming (OOP) language to write and encapsulate an application's transactions, functions, and data structures. To provide an understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class.

An object is a generic term that is used in the object-oriented programming environment to refer to a module that contains related code and variables. A software application can be written using an object-oriented programming language whereby the program's functionality is implemented using objects.

Implementation in the Java Programming Language

The description, examples, and implementations described below may refer to or utilize the Java programming language, but the invention is not limited to use of the Java programming language and may be implemented in any type of programming language. For example, embodiments of the invention may be implemented in any type of programming language (object oriented or otherwise) including but not limited to programming languages such as FORTRAN, Pascal, Assembly Language, C, C++, Ada, LISP, Small Talk, Visual Basic, or the Java programming language.

The Java programming language is an object-oriented programming language with each program comprising one or more object classes. Classes in the Java programming language are compiled into machine independent bytecode class files. Each class contains code and data in a platform-independent format called the class file format. The computer system acting as the execution vehicle supports the Java runtime environment. The runtime environment contains a program called a virtual machine, which is responsible for executing the code in classes.

Applications may be designed as standalone Java applications, or as "applets" which may be identified by an applet tag in an HTML document, and loaded by a browser application. The class files associated with an application or applet may be stored on the local computing system, or on a server accessible over a network. Each class is loaded into the runtime environment, as needed, by the "class loader."

Classes are loaded on demand from the network (stored on a server), or from a local file system, when first referenced during an application or applet's execution. The runtime environment locates and loads each class file, parses the class file format, allocates memory for the class's various components, and links the class with other already loaded classes. This process makes the code in the class readily executable by the virtual machine.

Embodiments of the software apparatus may be implemented using any programming language including standard OOP object classes. For the purposes of the following description, references to objects, server, login server, and application server may refer to instances of OOP object classes.

Implementation of Software Apparatus for
Authenticating Users

One or more embodiments of the invention externalize the authentication mechanisms from the application servers. One or more embodiments of the invention comprise a login server that provides the authentication functionality that may be utilized by one or more web application servers (servers on the web that are running an application or maintain information that require user authentication). Alternatively, one or more embodiments of the invention may be utilized in a stand alone client/server application environment, wherein a token, which is functionally equivalent to a cookie may be utilized. According to one or more embodiments, the application server does not maintain any knowledge regarding authenticating a user but relies on the login server for authentication. Consequently, only the login server needs to be updated with a new authentication mechanism.

Figure 2:
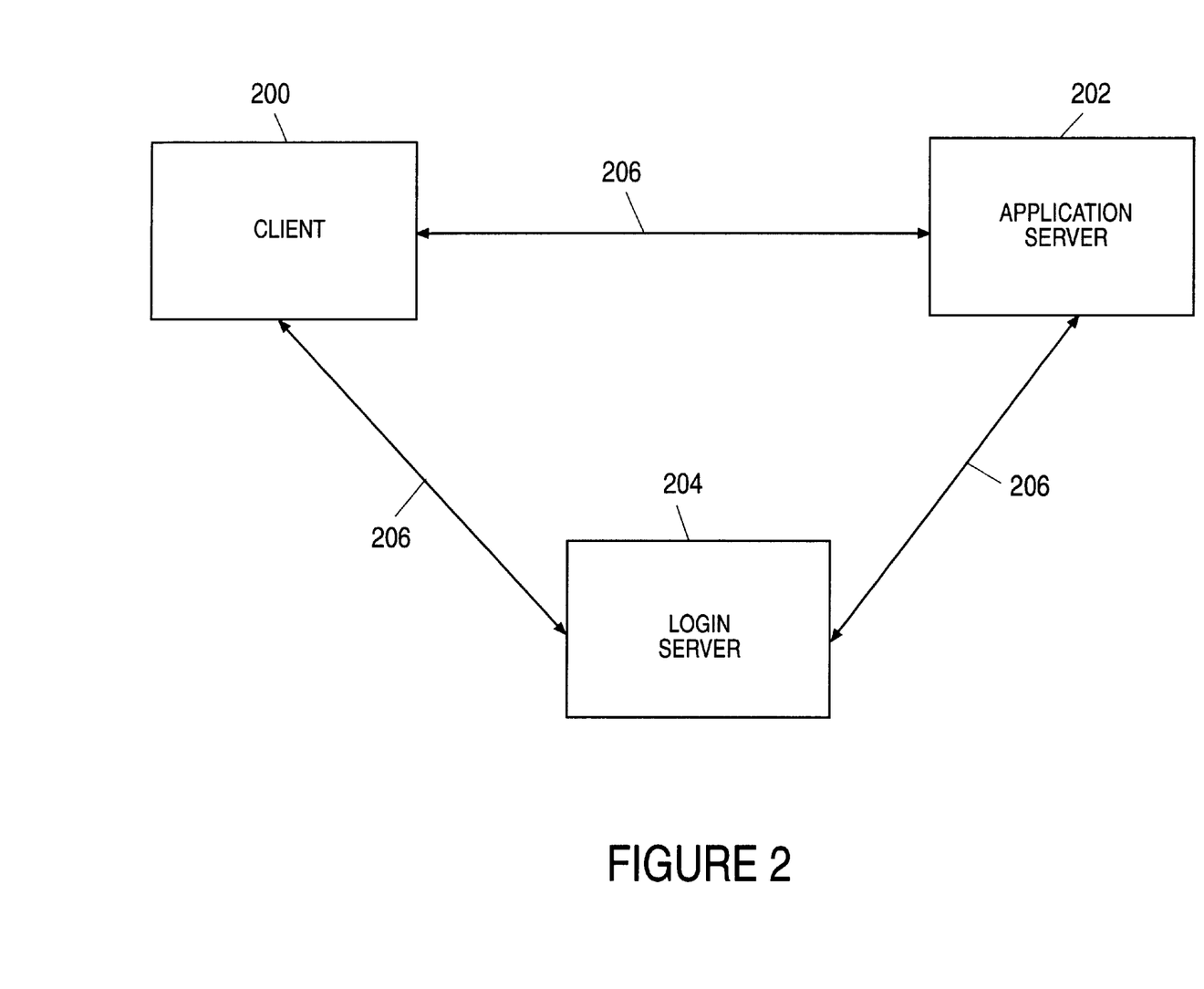
FIG. 2 illustrates the relationship between a login server, an application server and a client on the internet.

FIG. 2 illustrates the relationship between a login server, an application server and a client on the internet or a network. A client may be a computer user, any entity, or computer that requests (referred to as a "requester") information. Client 200 may communicate and retrieve information from application server 202 across network/internet connection 206. However, prior to providing information, application server 202 may require that client 200 authenticate itself to login server 204. Once authenticated, application server 202 may communicate directly with login server 204 to verify the authentication. After verification is complete, application server 202 may provide client 200 with any requested information.

Figure 3:
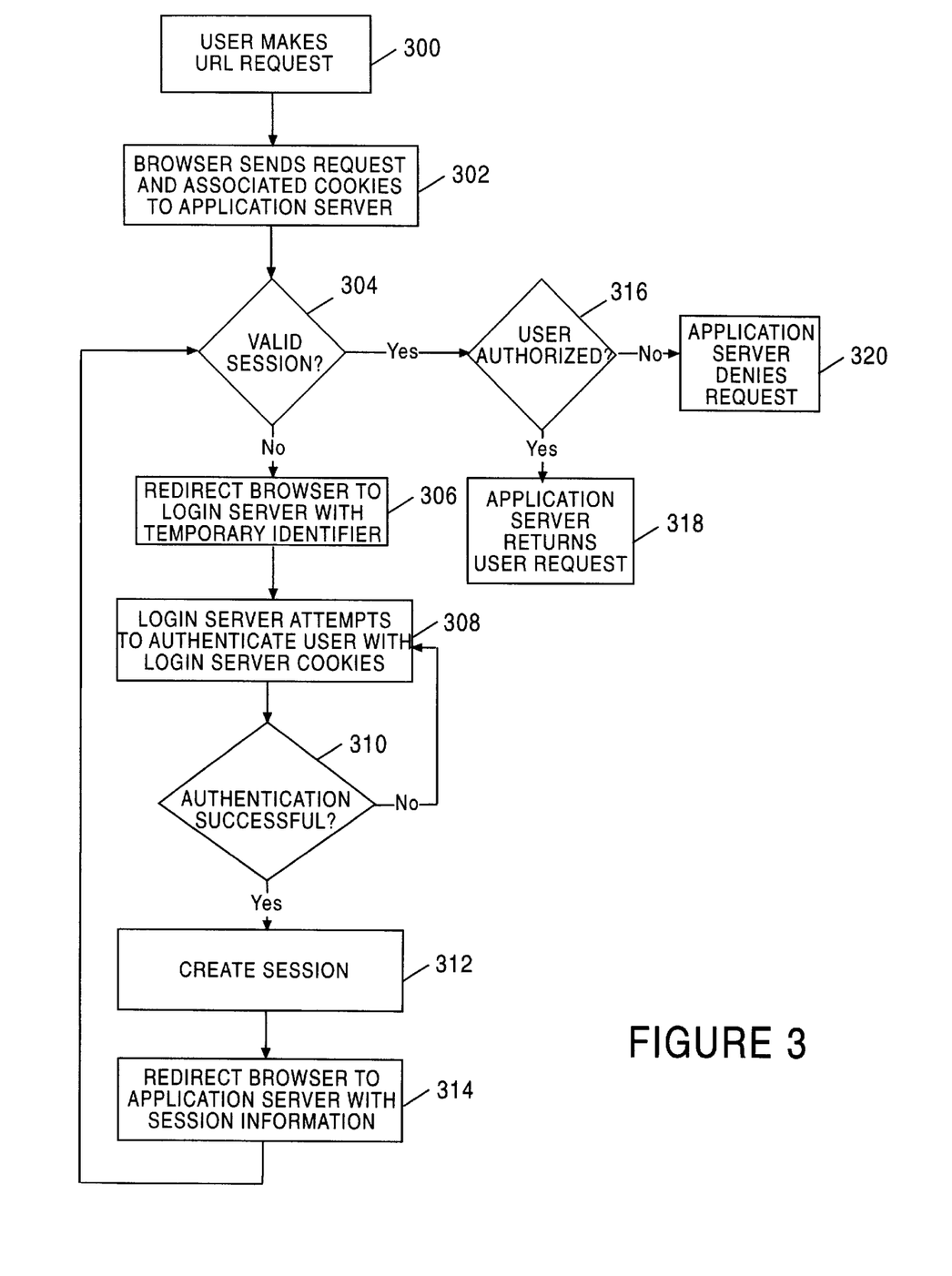
FIG. 3 illustrates a method for authenticating a user according to one or more embodiments of the invention.

FIG. 3 illustrates a method for authenticating a user according to one or more embodiments of the invention. At step 300, a user makes a URL request (or a network request). For example, the request may be initiated by entering a URL in a browser, clicking on a hyper link in the browser, or forwarded from an HTML form or Applet which is running inside the browser.

At step 302, the browser sends the request and any associated cookies stored in the browser to the application server. The application server determines if there is a valid session at step 304. A session is a communications connection between computers (such as a client and a server) for a given time period. Thus, once communication has been established between a client and an application server, a session for that communication time period exists. The session may end upon the conclusion of the specified time period or because the client or application server has terminated the connection. On the internet, a client may make several requests from a server during a session (e.g., the client may make a request from a server, receive a response, issue another request, receive a response, etc.). A session is valid if it exists for a particular user and has not expired or been terminated. A session or a list of sessions may be created and maintained by the server. A session list may contain information relating to the session that may include the client identifier and a time period for which the session is valid. Step 304 determines if there is a valid session currently active for the client. To locate a session, the cookie (or token in a stand alone client/server application) that is forwarded from the browser may be examined and compared to sessions currently active (e.g., from the list of sessions). If no cookie (or token) is forwarded from the browser, the session is not valid (e.g., this may be the first request from the browser to the application server or the session may have timed out or been terminated).

As an alternative to a session list, a "session service" may be utilized that is responsible for and controls access to sessions. A session service may create, validate, and invalidate user sessions. Thus, step 304 may be performed by a session service that uses the cookies to find a session associated with the user.

If there is no valid session, the application server redirects the client's request to a login server at step 306. To redirect a request, the application server sends a redirect message (with the login server's URL) back to the client's browser. The redirect message may also include the application's URL, a cookie for the application, and a temporary identifier. When a browser receives a redirect message, the browser automatically sends a request to the specified URL (e.g., the login server's URL) without any interaction from the user along with any existing cookies (or tokens) for the specified URL.

At step 308, the login server attempts to authenticate the user. The login server is configured with any relevant authentication mechanisms. For example, the login server may be configured to authenticate a user based on the username and password mechanism, the challenge-response mechanism, and the smart card mechanism. The login server attempts to authenticate the user based on the various mechanisms available. For example, the login server may consist of a login service that is responsible for a user interface that the browser displays to accept user input (also referred to as authentication information) such as a username and password. The login service may then forward any retrieved results to an authentication service that compares the retrieved information to stored information that determines whether the information provided is valid. If the authentication service is unable to authenticate the user, it may repeat step 308 to attempt to authenticate once again.

If the authentication is successful, a session for that particular user is created at step 312. A session service as described above may be utilized to create the session and return any session information back to the login server (or login service if utilized). Additionally, the temporary identifier may be stored if the authentication is successful. At step 314, the login server redirects the browser back to the application server along with the session information. Now that a valid session has been created, when the determination at step 304 is made, a valid session is found thereby permitting the process to continue at step 316. Further, a cookie (or token) for the login server may be transmitted to the client's browser. By storing the cookie, the login server can easily determine if the client has been previously authenticated (e.g., by retrieving the cookie or token) and may not require the user to reenter necessary information (e.g., a username and password). If such a cookie (or token) is transmitted, one or more embodiments may set the cookie's (or token's) parameters to restrict the retrieval of the cookie (or token) to the login server domain and path.

At step 316, a determination is made regarding whether the user is authorized for the particular request. This step may also be viewed as the application server checking directly with the login server to verify the authorization of the user. For example, the application server may check with the login server by providing the temporary identifier. The login server may compare the temporary identifier provided by the application server to the stored temporary identifier from the properly authenticated user. If the identifier's match, the login server can verify that the user attempting to process a request has been authenticated with the login server.

In one or more embodiments of the invention, the application server may send the browser's request to an "authorization service" to check if the user is authorized for the request. The authorization service may then retrieve a profile for the user (e.g., from a "profile service") and compare the profile to a list of those users that are authorized for the request.

If it is determined that the user is authorized at step 316, the application server may return the requested information (e.g., web page) to the user/browser at step 318. If the user is not authorized, the application server may deny the user request at step 320.

In one or more embodiments of the invention, the application server caches the session information (stores the information in local memory). By caching the session information, the application server does not need to contact the login server for every request by the user. The cached information may be updated by the login server (or session service) forwarding updated information to the application server. To update the information, the application server may request an update from the login server (or session service).

As described above, the login server checks if a request has an active and valid session, if the user has not been authenticated, the login server enforces authentication, and the login server may obtain user profile information. In this manner, the applications on the application server need not be concerned about authenticating a given user. The application server merely needs to know how to work with the login server to authenticate the user. Further, communications between the application server and login server are transparent (or without any interaction from) the user (although the user may see the browser communicating with each server).

Figure 4:
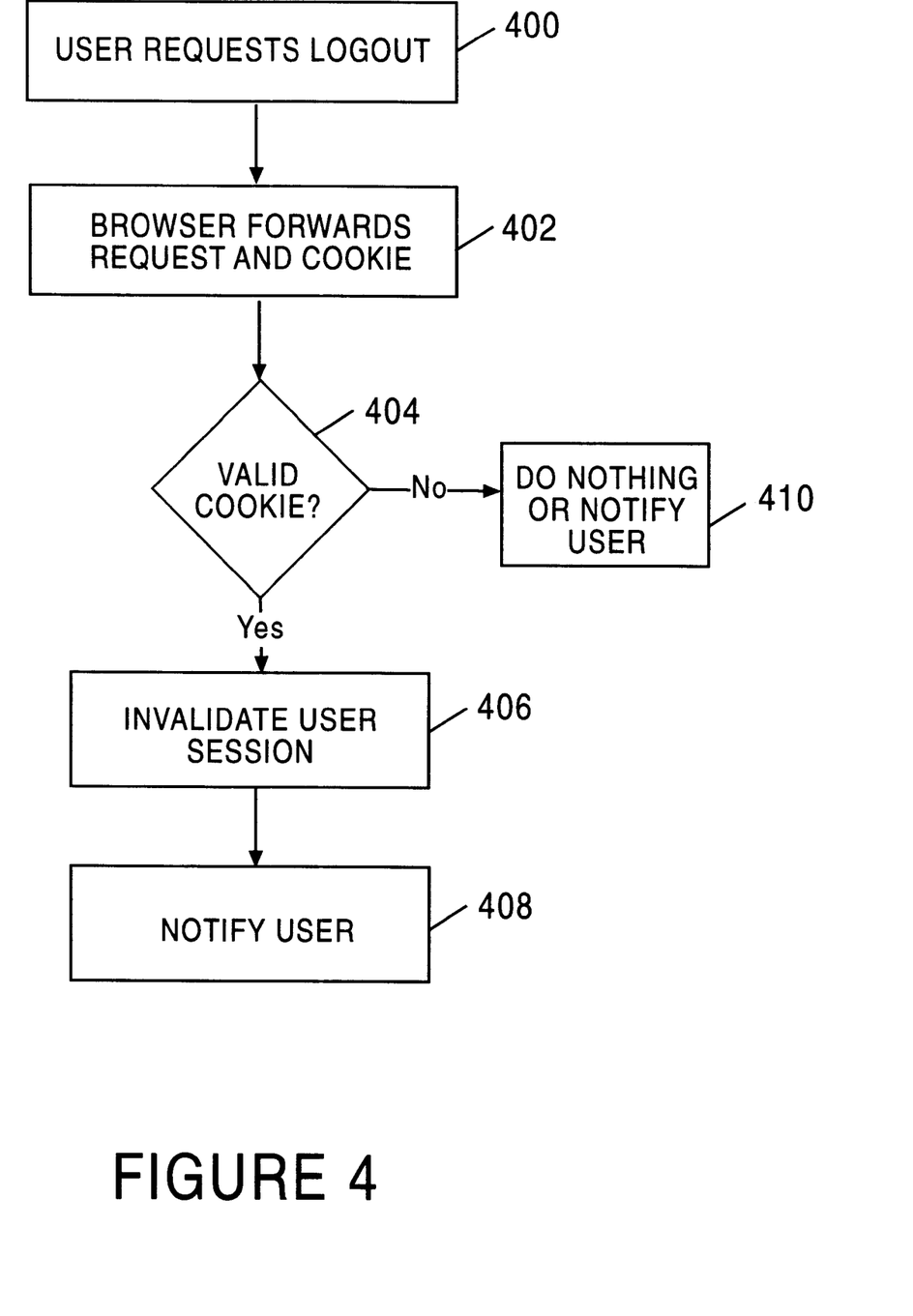
FIG. 4 demonstrates the logout sequence according to one or more embodiments of the invention.

In one or more embodiments, the user may logout/signoff of the application server. Such an action acts to terminate the current session for that user. FIG. 4 demonstrates the logout sequence according to one or more embodiments of the invention. At step 400, the user may issue a logout request by entering the logout URL in the browser or by clicking on a link in the browser (e.g., a link that says "Logout"). To effectuate the logout, the browser may send the request to the application server (which may forward the request to a login server or a session service) and forward the associated cookie (or token) with the request at step 402. If the associated cookie (or token) is not forwarded, then a hacker can logout another user by sending the logout request to the login server. Additionally, the cookie (or token) identifies the user that is requesting a logout. Without the cookie (or token), the server may not know who is requesting a logout. At step 404, the server determines if the cookie (or token) is valid. If the cookie (or token) is valid, the application server (or session service) may invalidate the current session for the user at step 406 and send back a notification to the browser (e.g., notifying the user that he/she has been logged out) at step 408. If the cookie (or token) is not valid, the server may do nothing further or may notify the user that the request cannot be processed at step 410.

In one or more embodiments, an application server or login server may force a user to logout because the time for the current session has expired. For example, if a user connection is terminated (e.g., the user's modem is turned off or the user has not made any requests for a period of time) prior to logging out, the user is automatically logged out by terminating the session. To logout a user, the application server may check with the login server (or session service) to see if a user session is still valid. If still valid, the application server may reset the time period for that session. If the session is no longer valid, the application server may destroy the session causing the rejection of any future requests (and triggering the login sequence as described above).

In one or more embodiments of the invention, a secure connection may be utilized to transfer information between the login server, application server, and browser. For example, the secure communication may provide that any information transmitted is encrypted prior to transmission. During encryption a message is converted, from a format referred to as "plaintext" (i.e., readable by anyone) into an encrypted format, known as "ciphertext" (i.e., only readable by someone able to decrypt the message). Further, the secure parameter of the cookie (as described above) may indicate the requirement for such a connection. One commonly utilized secure protocol that may be utilized by one or more embodiments of the invention is referred to as HTTPS (the HTTP as described above that is enabled to provide a Secure connection).

To enable an application to communicate with the login server and remove any authentication functionality from the application server, one or more embodiments may require the use of a web server (any server that supports servlets). A servlet is a software program that runs on a server. A servlet can be invoked by a client via a name or a URL, for example. The web server implements classes that provide for the performance of requested actions for the client. For example, a doGet method may be implemented to perform a GET action and a doPost method may be implemented to perform a POST action. The doGet and doPost methods are only called once a user has been validated (i.e., has a valid cookie) and authenticated in accordance with the invention. In one or more embodiments, the doGet and doPost methods are subclasses of an AuthHttpServlet class. Thus, any applications that provide for the functionality to communicate with the login server will work in accordance with one or more embodiments of the invention.

In one or more embodiments, a web server may provide for the functionality to work with the login server. As a result, servlets (applications on the application server) are protected such that they only respond to client requests if the user has a valid cookie (or token) and has been authenticated. In one or more embodiments, utilizing such a web server may not require servlets to subclass an AuthHttpServlet class. Alternatively, servlets may subclass an HttpServlet class. In such a subclass, the doGet and doPost methods may be overridden to provide the desired application functionality when an authenticated user invokes such a servlet. Although any type of web server may be utilized, an example of a web server that may provide for such functionality is the Java web server available from Sun Microsystems.

Thus, a method and apparatus for authenticating users is described in conjunction with one or more specific embodiments. The invention is defined by the claims and their full scope of equivalents.

What is claimed is:

1. A method of authenticating users comprising:

a client requestor transmitting a request to a first server;

said first server redirecting said client requestor to a second server if said client requestor does not have a valid session, wherein said valid session comprises an allowable period of time during which a user may access one or more servers in a network of computers;

said second server authenticating said client requestor;

said second server creating a new session; and said second server redirecting said client requestor to said first server.

2. The method of claim 1 further comprising creating said new session if said authenticating is successful.

3. The method of claim 2 wherein said first server redirects said client requestor to said second server when said valid session does not exist.

4. The method of claim 2 further comprising:

said client requestor transmitting a request to logout and a cookie to said first server; and said first server invalidating said session if said cookie is valid.

5. The method of claim 1 further comprising:

said first server receiving said request from said client requestor;

said first server attaching a temporary identifier to said request;

said first server redirecting said client requestor to said second server using said request information, wherein request information comprises said temporary identifier;

said second server storing said temporary identifier in a location accessible to said first server, and indicating a successful authentication; and said first server accessing said location to obtain said stored temporary identifier for verification of said session.

6. The method of claim 1 wherein said second server authenticating said client requestor comprises:

obtaining a cookie from said client requestor; and indicating a successful authentication if said cookie is valid.

7. The method of claim 1 wherein said second server authenticates said client requestor using a username and password mechanism.

8. The method of claim 1 wherein said second server authenticates said client requestor using a challenge-response mechanism.

9. The method of claim 1 wherein said second server authenticates said client requestor using a smartcard mechanism.

10. The method of claim 1 wherein said step of said second server authenticating said client requestor comprises:

obtaining authentication information from said client requestor; and determining if said authentication information is valid.

11. The method of claim 1 further comprising said first server transmitting a response to said requestor.

12. A system comprising a client requestor;

a first server configured to process a request from said requester and redirect said client requester to a second server; and said second server configured to authenticate said client requester and redirect said client requestor to said first server.

13. The system of claim 12 further comprising a session service configured to create a session if said authentication by said second server is successful.

14. The system of claim 13 wherein said first server redirects said client requestor to a second session when a valid session does not exist.

15. The system of claim 13 further comprising:

said client requestor configured to transmit a request to logout and a cookie to said first server; and said session service configured to invalidate said session if said cookie is valid.

16. The system of claim 12 further comprising:

said first server configured to transmit a temporary identifier with said redirection to a second server;

said second server configured to store said temporary identifier; and said first server further configured to verify authentication with said second server utilizing said temporary identifier.

17. The system of claim 12 wherein said second server is configured to:

obtain a cookie from said client requestor; and indicate a successful authentication if said cookie is valid.

18. The system of claim 12 wherein said second server authenticates said requester using a username and password mechanism.

19. The system of claim 12 wherein said second server authenticates said client requestor challenge-response mechanism.

20. The system of claim 12 wherein said second server authenticates said requester using a smartcard mechanism.

21. The system of claim 12 wherein said second server is configured to:

obtain authentication information from said client requester; and determine if said authentication information is valid.

22. A computer program product comprising:

a computer usable medium having computer readable program code embodied therein configured to authenticate client requestors, said computer program product comprising:

computer readable program code configured to cause a computer to request information from a first server;

computer readable program code configured to cause said first server to redirect said client requestor to a second server;

computer readable program code configured to cause said second server to authenticate a client requester of said information; and computer readable program code configured to cause said second server to redirect said client requestor to said first server.

23. The computer program product of claim 22 further comprising computer readable program code configured to cause a computer to create a session if said authentication by said second server is successful.

24. The computer program product of claim 23 wherein said computer readable program, code configured to cause said first server to redirect said client requester to a second server comprises computer readable program code configured to cause said first server to redirect said client requestor to a second server when a valid session does not exist.

25. The computer program product of claim 23 further comprising:

computer readable program code configured to cause a computer to transmit a request to logout and a cookie to said first server; and computer readable program code configured to cause a computer to invalidate said session if said cookie is valid.

26. The computer program product of claim 22 further comprising:

computer readable program code configured to cause said first server to transmit a temporary identifier to said second server;

computer readable program code configured to cause said second server to store said temporary identifier; and computer readable program code configured to cause said first server to verify authentication with said second server utilizing said temporary identifier.

27. The computer program product of claim 22 wherein said computer readable program code configured to cause said second server to authenticate said client requester comprises:

computer readable program code configured to cause said second server to obtain a cookie from said client requestor; and computer readable program code configured to cause a computer to indicate a successful authentication if said cookie is valid.

28. The computer program product of claim 22 wherein said computer readable program code configured to cause said second server to authenticate said client requestor comprises computer readable program, code configured to utilize a username and password mechanism to authenticate said client requestor.

29. The computer pogrom product of claim 22 wherein said computer readable program, code configured to cause said second server to authenticate said client requestor comprises computer readable program code configured to utilize a challenge-response mechanism to authenticate said client requestor.

30. The computer program product of claim 22 wherein said computer readable program code configured to cause said second server to authenticate said client requester comprises computer readable program code configured to utilize a smartcard mechanism to authenticate said requester.

31. The computer program product of claim 22 wherein said computer readable program code configured to cause said second server to authenticate said client requester comprises:

computer readable program code configured to cause a computer to obtain authentication information from said client requestor; and computer readable program code configured to cause a computer to determine if said authentication information is valid.

32. The computer program product of claim 22 further comprising computer readable program code configured to cause said first server to transmit a response to a client requestor of said information.

* * * * *

UNITED STATES PATENT AND TRADEMARK OFFICE
CERTIFICATE OF CORRECTION

PATENT NO. : 6,226,752 B1
DATED : May 1, 2001
INVENTOR(S) : Gupta et al.

It is certified that error appears in the above-identified patent and that said Letters Patent is hereby corrected as shown below:

<u>Title page,</u>
Item [56], References Cited, U.S. PATENT DOCUMENTS, insert:
-- 5,708,780      1/1998         Levergood et al. --

Signed and Sealed this

Sixteenth Day of September, 2003

JAMES E. ROGAN
*Director of the United States Patent and Trademark Office*